Figure 1:
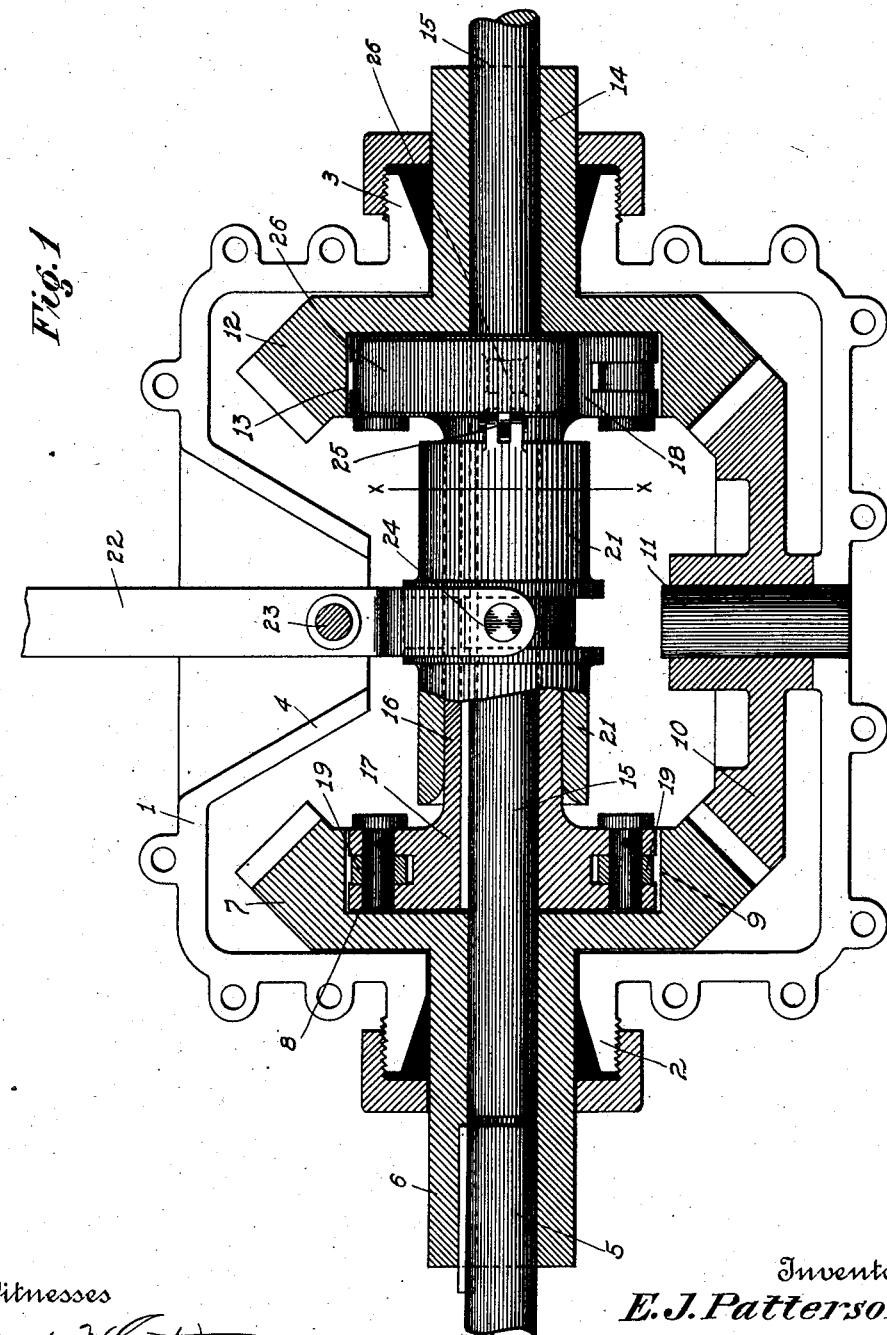

E. J. PATTERSON.
CLUTCH FOR REVERSING GEARING.
APPLICATION FILED JULY 20, 1911.

1,011,481.

Patented Dec. 12, 1911.

2 SHEETS—SHEET 1.

Witnesses

Inventor
E. J. Patterson

Attorney

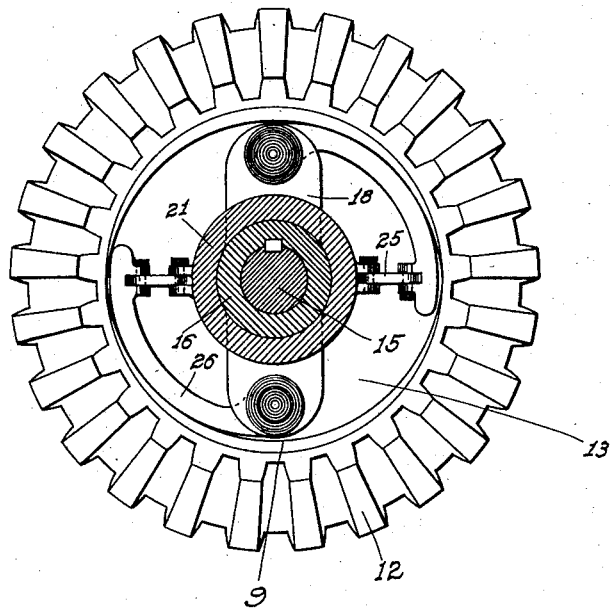

UNITED STATES PATENT OFFICE.

EDIE J. PATTERSON, OF STOCKTON, CALIFORNIA.

CLUTCH FOR REVERSING-GEARING.

1,011,481. Specification of Letters Patent. Patented Dec. 12, 1911.

Application filed July 20, 1911. Serial No. 639,524.

*To all whom it may concern:*

Be it known that I, EDIE J. PATTERSON, a citizen of the United States, residing at Stockton, in the county of San Joaquin, State of California, have invented certain new and useful Improvements in Clutches for Reversing-Gearing; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to reversing gearing for motors, and particularly to a clutch for a reversing gearing adapted to be used on traction engines, launches, or similar devices where no brake mechanism can be used to advantage, the object of the invention being to produce such a clutch for the reversing gearing as can be used to immediately reverse the power of the motor on such device without the breaking of parts or without undue friction, or the necessity of sliding gears or frictional bands which are not satisfactory on devices of the kind named.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a longitudinally sectional view of my improved reversing clutch for gearing. Fig. 2 is a sectional view taken on a line X—X of Fig. 1.

Referring now more particularly to the characters of reference on the drawings, 1 designates the gear casing having two end journal boxes 2 and 3 and a central inwardly deflecting plate 4.

The numeral 5 represents the motor shaft which is keyed to a sleeve 6 journaled in the box 2 and having an inner beveled gear 7, such gear 7 being provided with an internal recess 8, such gear having eccentric sides 9 within said recess 8. Such gear 7 intermeshes with another beveled gear 10 journaled on a pin 11 in the casing 1, which gear 10 intermeshes with another beveled gear 12 similar in construction to the gear 7 in having a recess 13, such recess having eccentric sides similar to the sides 9. This gear 12 has a sleeve 14 projecting through the box 3 and disposed over the tail or driven shaft 15, which shaft also projects through the sleeve 6 and is freely turnable within both of said sleeves 6 and 14.

Keyed to the shaft 15 within the casing 1 is a sleeve 16 having cross ends 17 and 18 respectively. Mounted in hinged relation to the cross ends 17 are bands 19, such bands being connected by links 20 with another sleeve 21 adapted to be shifted one way or the other by a lever 22 fulcrumed at 23 on the member 24 and having the usual yoke connection 24 with said sleeve 21. When the sleeve 21 is driven toward the member 17, the action of the links 20 expands the bands 19 against the eccentric surfaces 9 of the gear 7, which action causes the shaft 15 to be revolved one way by reason of the keyed connection between the driving shaft 5 and the sleeve 6, on which is the gear 7. Similarly, on the other end of the sleeve 21 links 25 are connected with bands 26 adapted to engage the eccentric surfaces of the gear 12 so that when the sleeve 21 is driven in the opposite direction to that described above, these bands 26 lock with the gear 12 and then the shaft 15 is revolved in the opposite direction to that described above by reason of the keyed connection between the driving shaft 5, sleeve 6, gear 7, gear 10, gear 12, bands 26 and sleeve 16 keyed to said shaft 15.

As will be noted the communication between the bands and the eccentric surfaces of the gears is not that of a friction band, but is merely that of a lock, the same sliding into locked position by reason of the gradual connection caused by said eccentric surfaces, but when once locked they will hold securely and are not dependent upon frictional contact alone, but merely by the position of the sleeve 21. Hence, when the shaft 15 is being driven rapidly in one direction the gears may be entirely disconnected therefrom and then gradually locked into reversing position, as described, without any sliding gear or frictional band connection, and without any change in the status of the driving shaft 5, such as bringing the same to a sudden stop or reversing the motion of the gears since regardless of forward or reverse motion of the shaft 15 the driving gears at all times move in the same direction as will appear.

From the foregoing description it will readily appear that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A clutch for gearing comprising a shaft, a gear on said shaft, such gear being provided with a recess in its face, such recess having eccentric sides, a member mounted on said shaft and adapted to revolve therewith, shoes mounted in hinged relation on said member adapted to engage said eccentric sides, and a sleeve slidably mounted over said member and having links connected with said bands as described.

In testimony whereof I affix my signature in presence of two witnesses.

EDIE J. PATTERSON.

Witnesses:
PERCY S. WEBSTER,
STEPHEN N. BLEWETT.

---

Copies of this patent may be obtained for five cents each, by addressing the "Commissioner of Patents, Washington, D. C."